Nov. 23, 1943.   H. C. A. MEYER ET AL   2,334,831
FLOW CONTROL SYSTEM FOR WASHING MACHINES
Filed July 30, 1940   5 Sheets-Sheet 5

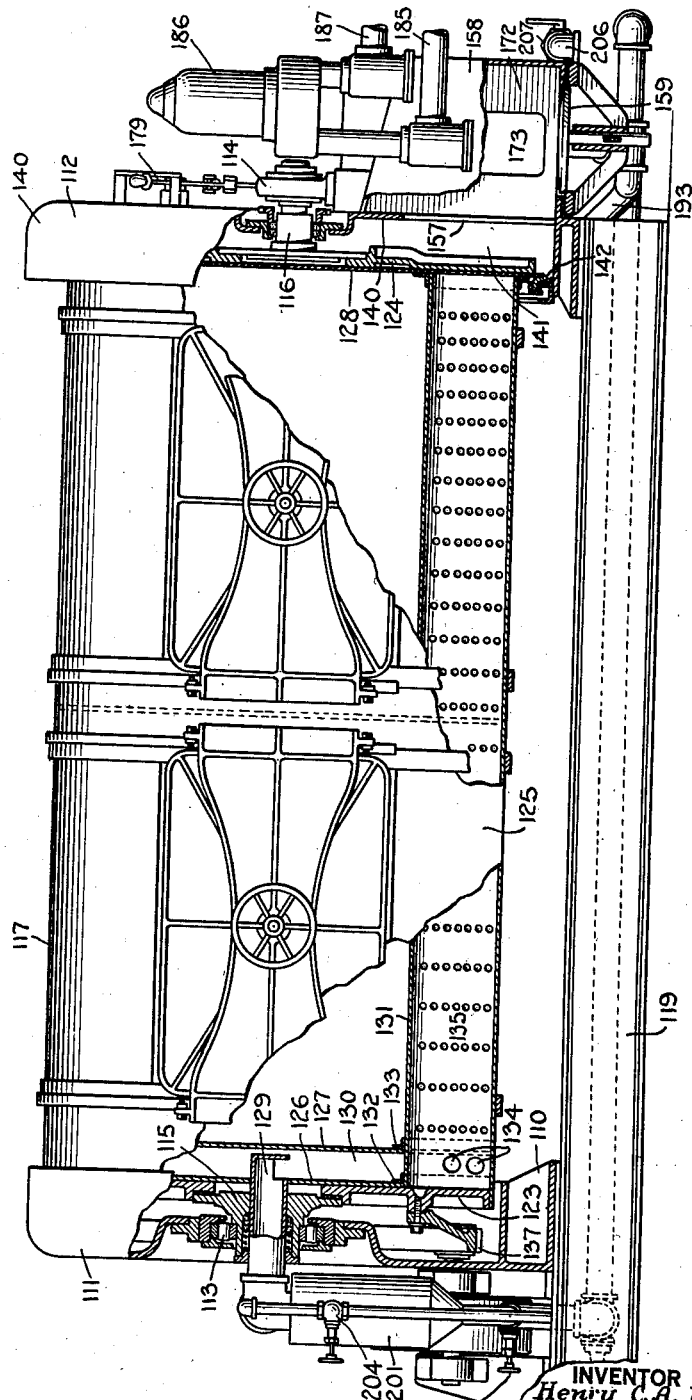

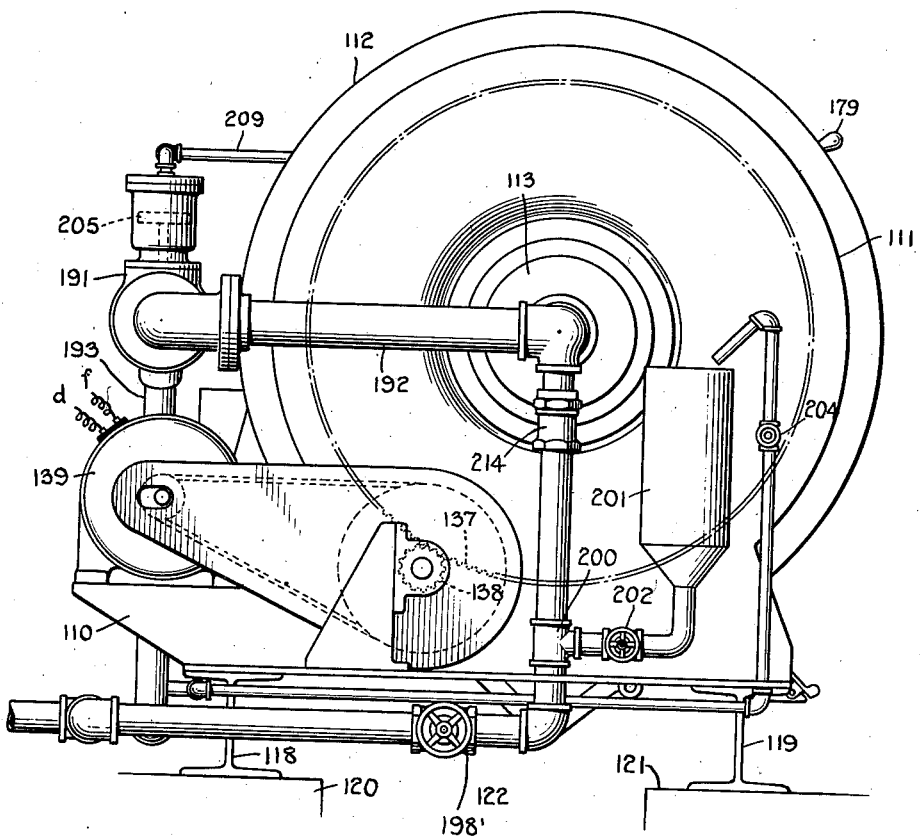

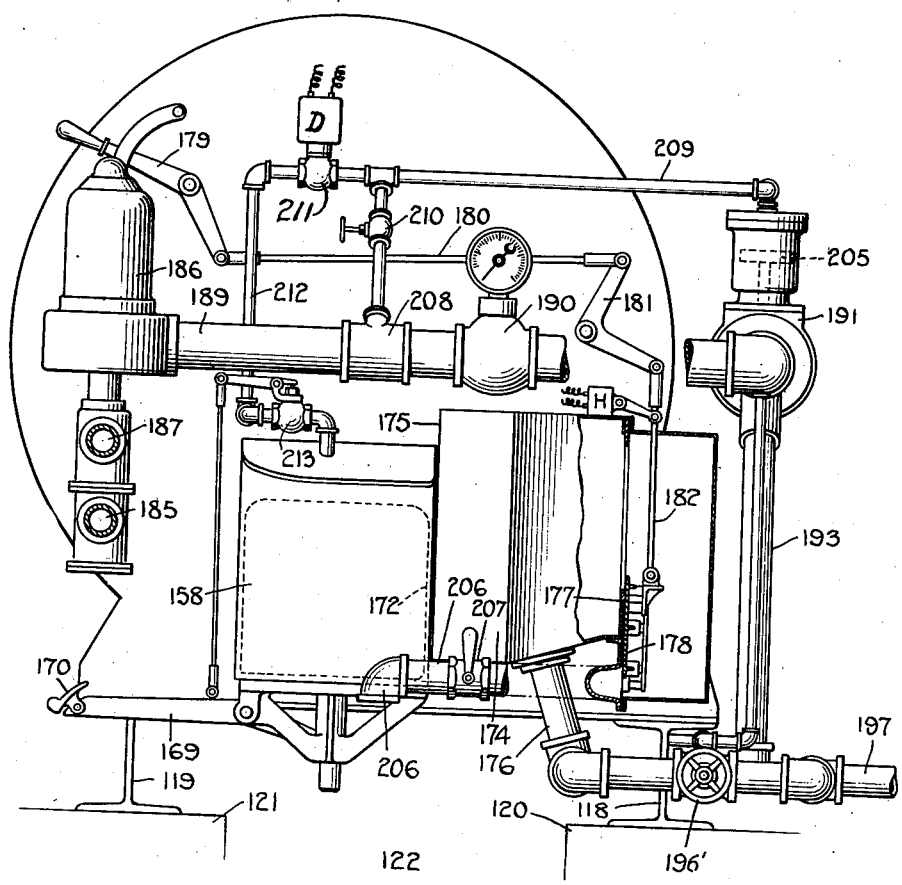

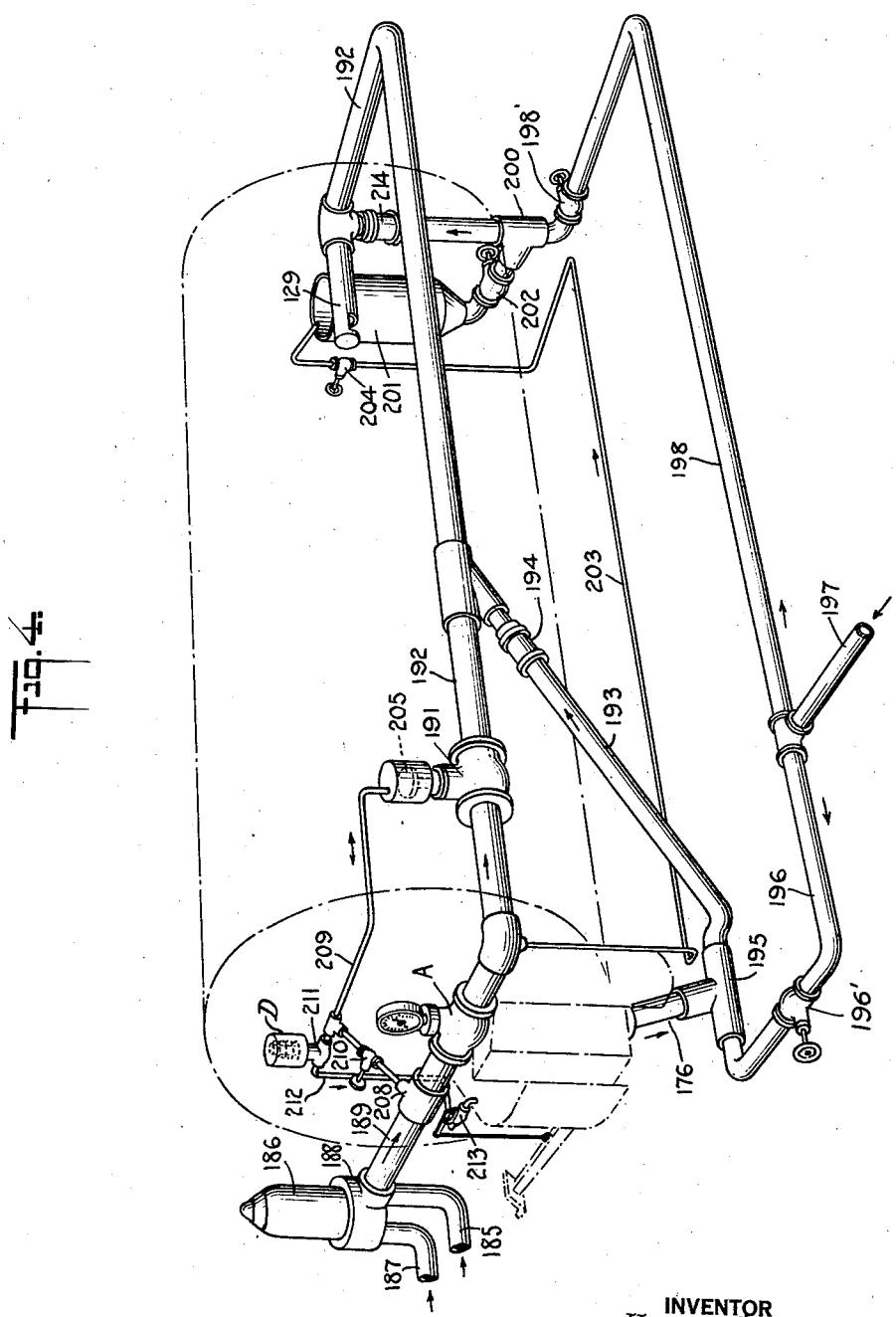

INVENTORS
Henry C. A. Meyer
Arnold Erlanger
BY Blair, Curtis + Hayward
ATTORNEYS Patented Nov. 23, 1943

2,334,831

UNITED STATES PATENT OFFICE 2,334,831

FLOW CONTROL SYSTEM FOR WASHING MACHINES

Henry C. A. Meyer, Syracuse, N. Y., and Arnold Erlanger, Elizabeth, N. J., assignors to United States Hoffman Machinery Corporation, New York, N. Y., a corporation of Delaware Application July 30, 1940, Serial No. 348,366

5 Claims. (Cl. 221—101)

This invention relates to flow control systems, and more particularly to a system for controlling the liquid supply to washing machines, or like apparatus.

It has heretofore been attempted to carry out the washing cycle with washing machines having various structural characteristics by various systems of continuous or semi-continuous operation, in which water or other treating liquids were allowed to flow continuously through the apparatus during all or certain stages of a cycle which might include one or more sudsing and several rinsing stages, the wash liquid being maintained at a predetermined level or levels and washing agents admitted as desired. During such operation the dump valve remains closed until the end of the cycle when washing, rinsing, blueing, etc. are completely finished.

During the first or sudsing period of operation the liquid level in the washer is usually maintained at a low level (four or five inches) while during rinsing the liquid level is raised to nine or ten inches. The present system of control of liquid flow is intended for use with washing apparatus in which an adjustable gate or weir is employed to limit the liquid level during the low and high level periods of operation and the flow control comprises an electrical network including devices appropriately conditioned to admit wash water or other treating liquid continuously when the gate is set at the low level, as for sudsing, until a predetermined quantity of liquid has been admitted to the washer, after which no more liquid can enter the washer until the gate is raised to the rinsing level, except through the performance of certain special manipulations on the part of the attendant in charge of the machine. As soon, however, as the level controlling gate is changed to the high or rinsing level, certain devices are set in operation to admit water or other liquid intermittently in successive charges of predetermined quantity until a desired predetermined number of such charges have entered the washer, after which the automatic system ceases to function and additional liquid for rinsing can only be added by further special acts of the attendant.

One of the objects of the invention is to provide an electrical control system of the nature described, comprising means for integrating successive charges of liquid admitted to the washer during either the sudsing or rinsing period of operation, and capable of changing the mode of operation of the system according to a predetermined plan.

A further object is to provide a control system of the nature described, comprising means associated with a manually operable level limiting device for selecting the mode of operation of the system.

A further object is to provide, in a control system of the nature described, associated metering, integrating and timing devices adapted simply and automatically to effect the operation of a liquid admission valve to admit liquid to the washer intermittently in successive charges of predetermined amount.

A further object is to provide means for manually initiating a flow of liquid to the washer at such times as the automatic system is inoperative and automatically to discontinue the flow after a charge of predetermined quantity has been received by the washer or other apparatus.

Other objects will be in part obvious or in part pointed out hereinafter.

The invention accordingly consists in the features of construction, combinations of elements, and arrangements of parts as will be hereinafter described, and the scope of the application of which will be indicated in the following claims.

In the accompanying drawings in which is shown one of the various possible embodiments of my invention—

Fig. 1 is in part a front elevation and in part a cross-section through a washing machine adapted for use with the present flow control system;

Fig. 2 is an end view of the machine as viewed from the left in Fig. 1;

Fig. 3 is a right end view;

Fig. 4 is a perspective view of the piping for the liquid supply of the washer;

Fig. 5 is a wiring diagram.

Similar reference characters refer to similar parts throughout the several views of the drawings.

Referring to Fig. 1, the washing machine will be seen to have a foundation or frame member 110 comprising at opposite ends upright pedestal members 111 and 112 in which are mounted roller bearing assemblies 113, 114 which respectively rotatably support the trunnions 115 and 116 of the wash wheel 117. Frame member 110 in the present embodiment is supported upon a pair of spaced I-beams 118, 119, themselves supported upon any suitable concrete or other foundation work 120, 121. The space 122 between the foundation members serves as a trough or sewer to receive and carry away waste wash water or other liquids from the wash wheel.

The wash wheel is imperforate throughout its length as regards its circumferential surface, and comprises a cylindrically formed through sheet 125 which extends from a spider member 123 at the left end to a spider member 124 at the right end. Each of these spider members is secured to and hermetically sealed with respect to the interior of the cylinder 125 in any suitable manner, as by welding or riveting. At its center, there is fastened to each of these spiders the corresponding trunnion member 115 or 116. Covering the interior of the left end spider 123 and secured thereto is an imperforate sheet which forms a head 126, and spaced therefrom an appropriate distance and securely fastened to the cylinder 125 is a second imperforate plate or head 127. At the right end of the cylinder, secured to the inner side of the spider 124 in a similar manner, is a perforate plate 128 which serves to discharge water from the wash wheel, as will be hereinafter more fully described.

Extending through the left end trunnion 115 is a fluid inlet pipe 129, closed at its inner end and having its lower surface cut away to facilitate the discharge of incoming wash water or supplies downwardly into the inlet chamber 130, between the heads 126 and 127.

Tumbling ribs 131 extend from end to end of the wash wheel and are of usual form and construction. At the left end each of these tumbling ribs passes through the inner head or partition 127 and extends to and terminates in abutment with the outer head 126 to which it is joined, as by means of the angle iron 132. A similar angle iron 133 secures each tumbling rib to the partition 127 and serves to prevent escape of liquids from the inlet chamber 130 to the interior of the wash wheel except through the tumbling ribs themselves.

The head sheet 128 at the right end of the wash wheel is perforate throughout, except where it covers the tumbling ribs. Consequently no water can flow directly through the tumbling ribs to the discharge chamber at the right end of the machine.

Each tumbling rib is provided at its left end with a plurality of large openings 134 through which liquids in the chamber 130 may rapidly enter the ribs. Each tumbling rib is further provided with a large number of smaller perforations 135 through which the liquids entering the tumbling ribs may be rapidly discharged into the treatment space within the wash wheel.

Referring to Figs. 1 and 2, it will be seen that secured to the spider 123 at the left end of the machine there is provided a large spur gear 137 with which meshes the pinion 138 of a chain drive leading to the electric motor 139. This motor, as is usual in washing machines, is controlled in its operation so as to drive first in one direction and then in the opposite direction. This is accomplished automatically by means of a well known type of controller, not shown herein.

We have seen that the liquids which include hot and cold water, steam, and the various laundering agents required in carrying out the washing process, are all admitted to the inlet chamber 130 and through the tumbling ribs to the interior of the treatment chamber, by means of the pipe 129 passing through the hollow trunnion 115. The pipe connections to this inlet pipe will be followed and described hereinafter.

Waste wash liquids, as mentioned above, are discharged from the wash wheel through the perforate plate 128 at the right-hand end of the machine, and a discharge space to receive such liquids is formed within a surrounding stationary head member 140 comprising part of the foundation casting 112. This member 140 envelops the periphery of the wash wheel at its right end. Liquid from the wash wheel flows through the perforate plate 128 into the chamber 141 between said plate and the rigid head 140, and is prevented from leaking out of the chamber 141 by means of a rubber or other suitable sealing strip 142 making resilient contact with an extended portion of the perforate plate 128.

Referring again to Fig. 1, it will be seen that the stationary head 140 has a large opening 157 provided in its lower part centrally with respect to the vertical axis of the wash wheel. This opening admits waste liquids to a projecting box-like transition chamber 158 at the bottom of which is located a dump valve 159 of any suitable type, operable by means of a foot lever 169 extending beyond the foundation at the front of the machine where it is furnished with a pivoted treadle 170.

The rear wall 172 of the transition or dump chamber 158, as viewed in Fig. 1, is also provided with a central opening 173 of substantially the same height as the opening 157, but of less width. This opening leads into an intermediate chamber 174 included within a sheet metal housing 175 suitably secured to the right-hand wall of chamber 158. From the lower part of the chamber 174 a pipe 176 descends for a purpose explained hereinafter.

The outer or right-hand wall of the intermediate chamber 174 comprises a guide 177 for a sliding gate or weir 178.

It will be understood that the gate or weir 178 serves to determine the minimum level at which water or other liquids may overflow and drain away from the intermediate chamber and consequently from the wash wheel. This level, however, is variable, for at certain periods during a laundering operation it is desirable to operate at a low level in the wash wheel, while during other operations in the cycle a higher level may be desirable.

This change of level is attained by operating a hand lever 179 at the front of the machine which, through a link 180 and a bell crank lever 181, raises or lowers a rod 182 rigidly secured to the sliding gate.

Referring to Figs. 1, 2, 3 and 4, the pipe connections for leading water and supplies to the wash wheel, for leading waste liquid away from the ultimate discharge chamber, and for recirculating liquid between the intermediate chamber and the inlet, may now be described.

A pipe 185 leads hot water to a mixing valve 186. A similar pipe 187 leads cold water to the same mixing valve. This mixing valve is of a well known type and need not be described, it being sufficient to say that it may be adjusted to mix hot and cold water and deliver from its outlet water of any desired temperature. Its outlet, shown at 188, is connected by means of a pipe 189 through a registering water meter A to the inlet side of a piston operated valve 191, the outlet of which is connected by means of a pipe 192 with the above mentioned inlet pipe 129. Pipe 192 is also connected by means of a pipe 193 with the pipe 176 mentioned above as being connected with the intermediate chamber 174.

In the pipe 193 is a check valve 194 and the pipe 176 is connected to the pipe 193 by means of an injector fitting 195 connected by means of a pipe 196 and hand operated valve 196' with a steam supply conduit 197. The steam conduit 197 is connected by means of a pipe 198 and a hand operated valve 198' with an injector fitting 200 by means of which laundry supplies of whatever kind, as for example lye, soap, sour, bleach or blue, may be ejected from a supply tank 201 to the said water supply inlet connection 129. A hand operated valve 202 is interposed in the piping between the tank 201 and the injector fitting 200. By means of the injector 195, when desired, overflow liquid from the discharge chamber may be forced through the pipes 193 and 192 and the inlet pipe 129 into the washer and thus recirculation of the wash liquid advantageously effected. A water pipe of small diameter, indicated by the number 203, connects the hot and cold water supply from a point located between the meter A and the piston controlled valve 191 with a hand operated valve 204 having an outlet disposed to discharge into the top of the supply tank 201. This pipe may be used to supply a desired quantity of water to concentrated supplies in the tank or hopper 201, and also may be used to rinse the hopper 201 after a washing agent of any kind has been added to the wash liquid.

Surmounting the piston operated valve 191 is a fluid pressure chamber containing a piston indicated by the reference numeral 205. This valve is normally held closed against the pressure in supply pipe 189 by means of fluid pressure exerted upon the upper side of piston 205. Liquids are normally drawn off from the overflow or ultimate discharge chamber of the washer by means of a pipe 206, best shown in Fig. 3, which discharges into the sewer space 122. In this pipe is a valve 207, adjustable by hand, to control the rate of discharge of wash liquid from the discharge chamber.

As will be more fully described hereinafter, during the rinsing portion of the washing cycle, rinse liquid is intermittently admitted in successive amounts of say 30 gallons each with timed intervals between charges, the flow of rinse liquid being measured and controlled by means of the meter A associated with the time control system shown in the wiring diagram, Fig. 5. The piston chamber of the valve 191 is connected above the piston by means of a ⅜" pipe line 209 with the water supply pipe 189, as by means of T 208. This ⅜" pipe line contains a restriction valve 210, of well known type, which may be adjusted to restrict the passage of water from the supply pipe 189 to the piston valve 191 and thus control the fluid pressure exerted upon the piston 205. The ⅜" pipe 209 is also connected by means of a solenoid operated pilot valve 211 with a pipe 212 discharging freely into the dump valve chamber 158. This pilot valve operated by the solenoid D, as shown in the wiring diagram, either intentionally or automatically, controls the opening and closing of the piston valve 191 to permit or obstruct the supply of liquid to the washing machine.

Whenever the pilot valve 211 is opened by excitation of the solenoid D, the fluid pressure upon the upper side of the piston valve is released permitting an immediate full opening of said piston valve and a constant rapid flow of liquid into the washer. A second valve 213 (normally open) is connected in the pipe 212 and operatively connected by means of appropriate linkage to the dump valve lever 169. The arrangement is such that when the dump valve is closed, as it normally is, valve 213 is open so that piston operated valve 191 may be opened by the release of pressure in the ⅜" pipe line through the operation of the solenoid valve 211. However, when the dump valve is open and the wash water or other liquid in the washer is being discharged therefrom, accidental operation of the solenoid valve will not release the pressure from the piston operated valve to cause opening of the supply pipe to the interior of the washer.

As stated above, supplies such as soda, bleach, blue, etc. are admitted by running the desired quantity into the tank or hopper 201. When supply or recirculation water is not flowing to the inlet pipe 129, a load of any washing agent contained in hopper 201 may be flushed into the inlet chamber 130 of the wash wheel by opening supply valve 202 and steam valve 199, a check valve 214 preventing a flow of water into the hopper from any of the other connections to the supply pipe 129. It will thus be understood that the washing agents are admitted into the chamber 130 of the wash wheel during the intervals when water is not flowing thereinto from another source. These supplies, with the water which flushes them into the inlet chamber, are thoroughly mixed in that chamber so that when the chamber is next flooded with liquid from the supply pipe, the washing agents are instantly carried through the tumbling ribs to all parts of the treating chamber and uniformly distributed throughout the latter.

While it is entirely feasible to operate the shell-less washer above described in the usual manner, admitting the supplies and carrying out each operation of the cycle separately and opening the dump valve to release each charge of wash liquid after it has performed its function, it has been found that greater economy results when the machine is operated in connection with the control system hereinafter described, whereby the desired amount of water for sudsing is rapidly admitted to the washer through the open supply valve 191. The meter A measures each 30-gallon charge passing therethrough and these charges are integrated until the desired quantity has been passed, after which no more water flows into the washing chamber until it is desired to rinse, at which time water is admitted intermittently in 30-gallon charges by operation of the automatic system disclosed in the diagram and hereinafter fully described.

For a fuller description of the shell-less washer itself, reference may be had to the copending application filed jointly by the present inventor Meyer and one Edwin F. Wesely, Serial No. 237,626 (now Patent No. 2,286,429).

While the present system of control is particularly desirable in relation to the shell-less washer shown herewith, it will be understood that such system is fully applicable to a double shell washer of the standard type.

Now referring to Fig. 5, A indicates a water meter provided with a single pointer making one revolution for every thirty gallons of water passed and closing an electric circuit at contacts 7—8 for say 60° angular distance during each revolution.

B indicates a ratchet relay serving as an impulse integrating device and provided with an actuating magnet B1 and reset magnet B2 having terminals 9—10 and 11—12, respectively. Magnet B1 is so connected in circuit with the meter contacts that every electrical impulse caused by successive bridging of said contacts drives the ratchet device forward. The ratchet device is biased to rotate in opposition to its ratchet action by means of a spring B3. Mounted upon the same shaft with the ratchet are a pair of cams B4 and B5. These cams comprise adjustable parts of a well known character which enable the cams to be set to actuate their respective followers, comprising spring contact members B6 and B7, after from 4 to 7 impulses and from 24 to 42 impulses respectively. Thus after a predetermined number of impulses, say 5, contacts 13—14 are closed, and after another predetermined number of impulses, say 24, contacts 15—16 are broken and contacts 15—17 are closed. The coil B2 having terminal connections 11—12 is provided to reset the ratchet mechanism to its homing position or zero, at the expiration of the complete washing cycle, or at the beginning of the next cycle of operations. Resetting is accomplished by depressing the reset button RS.

T indicates a conventional timing relay comprising a synchronous motor T1 and a magnetic clutch T2 which, when energized, causes the slow movement of a movable contact member 18 toward an adjustable fixed contact member 19 whereby, at the expiration of a predetermined and manually set period of time, contacts 18—19 are closed momentarily. Promptly thereafter the timing mechanism, as will be explained hereinafter, automatically returns to its zero or homing position.

D indicates the operating coil of the solenoid pilot valve 211 controlling operation of water supply valve 191 in the water supply line 189—192. Whenever the coil D is energized the pilot valve is open. As explained above, this pilot valve is so connected hydraulically to the 3″ main water valve 191 that when the pilot valve is opened the valve 191 is opened and water flows through the meter A into the washer, and when the pilot valve is closed the main valve is closed and the flow of water ceases.

E, G and F indicate magnet relays of conventional type. H indicates a standard commercial type door switch which, as shown in Fig. 3, is connected with the linkage by which the overflow weir or gate 178 is manipulated. The arrangement is such that when the gate occupies its lower position to maintain liquid in the washer at the sudsing level, switch contacts 20—21 are closed and contacts 22—23 are open; and alternatively when the gate 178 is set for a high or rinsing level, contacts 22—23 will be closed and 20—21 open.

Two colored signal lamps are shown, one, yellow, which is active when contact 13—14 is made after the required number of gallons of water for initial sudsing have passed through the meter to the washer, and the other, green, which is active when contact 15—17 is made after the predetermined quantity of water for rinsing has passed the meter. The latter signal indicates the end of the rinsing period as will be understood from the following description of the manner in which the various control instruments and devices function to control the operation of the washer during a single continuous washing and rinsing cycle.

In operation this control system works as follows:

Sudsing

The wash load having been placed in the washer while the latter is stationary and the washer doors closed and locked, soap and alkali of proper constituency are placed in the supply tank 201. These supplies are then ejected from the tank into the washer by opening the steam valve 193′. The reset button RS is depressed to return the ratchet relay mechanism to its zero position. The "start" button is depressed closing contacts 3—4. Current flows from power line L1 through wires $a$ and $c$ to contact 6 of a conventional magnetic starter JM. Current also flows from wire $c$ through magnet coil J to wire $f$ and out to the other side of the power circuit L2. Starter contacts 5—6 are closed by energization of J and maintained by the connection from L1 through the normally closed "stop" button, wire $b$, wire $c$, coil J, and out.

It will be understood that at this time relays E, F and G are unexcited; that gate switch H occupies the position indicated in the diagram and that the ratchet mechanism stands at its zero position with contacts 13—14 open and contacts 15—16 closed.

M indicates the driving motor for the washer. With the closing of the magnetic starter circuit the circuit through motor M is completed over wire $d$, wire $f$, and out to L2 and rotation of the washer commences. At the same time, current is fed from L1 through wires $d$ and closed contacts 24—25 of relay F to coil D of the pilot valve 211, the circuit being completed through wire $m$, contacts 20—21 of H, wire $f$, and out to L2. The pilot valve is thus opened, causing the main valve 191 to open wide and water to flow through the 3″ line through the meter A to the washer, where it will be retained so long as the manually operated discharge valve 207 is closed.

Water flowing through the meter causes rotation of a meter contact arm A′, every revolution of which momentarily closes contacts 7—8 allowing an impulse from line $d$ to be received by the ratchet relay coil B1. This circuit comprises wire $e$, coil B1, wire $j$, closed contacts 26—27 of relay G, wire $n$, and out to L2.

After a predetermined number of such impulses, say 5, in which case 5×30=150 gallons have been delivered to the washer, contacts 13—14 are closed by the contact arm B6, energizing wire $g$ through the closed contacts 7—8 of the meter and wire $e$. It will be noted that wire $g$ connects with contact 28 of relay G, with contact 30 of relay E, and with terminal 32 of the magnet coil E1 of relay E. Since relay G contacts 28—29 are closed, as shown, a circuit is completed through the "yellow lamp" to line L2. Another circuit is completed through the coil of relay G. The energization of G opens contacts 26—27 and 28—29 and closes contacts 33—34 and 35—36. Closing contacts 33—34 completes a sustaining circuit from wire $d$ through the "yellow lamp" and the coil of G. Thus relay G remains in its excited condition and the "yellow lamp" remains "on" to the end of the washing cycle. Simultaneously relay F is energized by current flowing from wire $g$, contacts 30—31 of relay E, wire $x$, coil of relay F, wire $m$, contacts 35—36 of relay G, and out to L2. Energization of relay F breaks contacts 24—25 and makes contacts 37—38, breaking the circuit through coil D of pilot valve 211 and stopping the flow of water to the washer. Breaking of contacts 26—27 at this point in the washing cycle permits the addition of single meter charges (30 gallons) of additional water for sudsing without exciting the impulse ratchet device and thus without affecting the number of charges later made available for rinsing. The addition of these subsequent charges of water are controlled by momentarily closing the "additional water" switch indicated as AW on the wiring diagram. This operation will be described later.

It should be understood that the setting of cam B4 of the ratchet relay is determined by the amount of load which has been charged to the washer so that a satisfactory amount of free liquid (over and above the amount required for absorption by the load) is provided in sufficient quantity to insure a good substantial suds for the sudsing operation. At this point it should be remembered that the load has been initially "wetted down" by a mixture of soap and alkali in order that the clothes may be quickly and effectively attacked thereby, as distinguished from the method ordinarily employed in conventional machines in which water is admitted first and then the supplies later. This method of attacking the clothes with the soap and alkali water mixture reduces the likelihood of setting stains and shortens the time necessary by the ordinary method for the supplies to come into active contact with the load. In other words, by the present procedure the supplies are brought with the water into instantaneous contact with the soil in the load.

The sudsing operation may now be continued for as long as may be desired, it being possible, as noted above, to add water at will by simply closing the switch AW without causing operation of the ratchet relay. If a second sudsing is thought desirable, the 30-gallon button (switch AW) is depressed, after first opening the discharge valve 207, for the purpose of flushing off the spent soap and soil. The button may be depressed as many as three or four times, according to the quantity of soil observed in the discharge, in order to prolong the flush. After the level within the machine has become normal, the discharge valve is closed and another charge of soap and alkali introduced in the same manner as before. Any number of such successive sudsing stages may be employed and vary from one another only in respect to the number of gallons of flush water provided. Also a smaller quantity of supplies is required for each succeeding sudsing.

The purpose of this flushing operation is to obtain a higher degree of soil removal than is obtainable by the ordinary dumping method and with a considerable saving of water and supplies. In the dumping method the wash load serves as a filter septum upon which the insoluble soil is redeposited during dumping. Flushing as described above prevents this redeposit of soil.

*Rinsing*

When it has been decided that sufficient sudsing has been accomplished, and that the rinsing procedure may be initiated, the operator raises the gate 178 by means of the hand lever 179 to the desired rinsing level. This operation, by reason of the interlinkage of the switch H with the gate operating mechanism, simultaneously moves the switch H to its lower or rinsing position, thus opening the circuit between wires *f* and *m* at the contacts 20—21 and closing the circuit through the wires *k* and *j* at the contacts 22—23.

It will be remembered that at the end of the normal admission of water for sudsing, contacts 13—14 of the ratchet relay, contacts 35—36 of relay G and contacts 37—38 of relay F are all closed, and that contacts 7—8 will also be closed because, after the delivery of the last 30-gallon charge of water to the washer, the meter will come to rest with its arm bridging contacts 7—8.

Current will now flow through the motor T1 and clutch T2 of the timer T over a circuit comprising wire *d*, contacts 37—38 of relay F, wire *r*, T1 and T2, wire *j*, contacts 22—23 of switch H, contacts 15—16 of the ratchet relay, wire *f*, and out to L2.

After the predetermined number of seconds for which the timer may have been set, timer contacts 18—19 will be closed and coil E1 of relay E will become excited by current flowing through a circuit including meter contacts 7—8, wire *e*, ratchet relay contacts 13—14, wire *g*, coil E1, wire *s*, contacts 18—19, wire *f*, and out to L2. Contacts 30—31 of relay E are now broken and contacts 40—41 are closed. This completes a sustaining circuit for relay E. Opening contacts 30—31 deenergizes relay F, opening contacts 37—38 and closing contacts 24—25. Current now flows through the coil D of solenoid pilot valve 211 effecting the opening of said valve. Thus main valve 191 is opened and water rushes into the washer through the meter A. In the meantime the timer has been deenergized by the opening of contacts 37—38 and the timer contacts 18—19 opened, deenergizing relay E.

The flow of water through the meter A breaks the meter contacts 7—8 which remain open until a 30-gallon charge of water has been passed to the washer. As soon as this is accomplished, however, meter contacts 7—8 are again closed to again excite relay F, since contacts 30—31 of relay E are now closed. Reenergization of relay F deenergizes the pilot valve 211 and the main valve 191 acts to cut off water to the washer. Each time the meter contacts 7—8 are closed the coil B1 is energized to give one impulse to the ratchet mechanism, the energizing circuit comprising contacts 7—8, coil B1, wire *j*, contacts 22—23 of switch H, contacts 15—16 of ratchet relay, wire *f*, and out to L2.

It will be understood, of course, that every impulse of the ratchet relay drives the cams B4 and B5 forward one step. Cam B4 has now finished its work and does not further effect a change of contacts 13—14 until the end of the washing operation when the ratchet relay is reset. However, after a predetermined number of such impulses, say, 24, the cam B5 will break contacts 15—16 and close contacts 15—17, thus terminating the automatic control of rinse water admission and closing a circuit through the green lamp. This circuit includes wire *d*, green lamp, wire *l*, contacts 15—17, wire *f*, and out to L2. The lighting of the green lamp indicates to the operator that the end of the automatic rinse stage has been reached.

From the above it will be seen that the raising of the gate by hand to the rinse level automatically starts a period of continuous rinsing during which the timer first takes control to open the main water valve after a predetermined short interval of time. Then after the meter has made one revolution the meter takes control to stop the water flow and start the timer for the reopening of the main valve after a small time delay. Thus the timer and the meter A alternately act intermittently to start and stop water flowing through the meter into the washer. It will be understood also that at the time the gate is shifted to the rinse level the discharge valve 207 is manually opened to permit continuous discharge of the rinse water after it has passed over the gate.

Mention has been made of the possibility of manually admitting 30-gallon charges of water to the washer at the end of the sudsing period; that is, after the ratchet relay has initially integrated a predetermined number of successive 30-gallon charges to the washer to establish a body of water in the washer sufficient for sudsing. Also that such additional sudsing charges are not integrated by the ratchet relay. This operation is as follows: it being understood that at this time ratchet relay contacts 13—14 and 15—16 are closed, momentary depression of the switch AW causes current to flow through wire e, contacts 13—14, wire g, coil E1, switch AW, wire f, and out to L2. Relay E breaks contacts 30—31, deenergizing relay F, thus opening pilot valve 211 and main valve 205 to start a flow of water through the meter into the washer. The switch AW can be immediately released, as a sustaining circuit for relay E is completed by the closing of contacts 40—41. The ratchet relay cannot operate since its circuit is broken at contacts 26—27 of relay G. As soon as meter contacts 7—8 are broken by rotation of the meter, relay E is deenergized and contacts 40—41 are broken and contacts 30—31 closed. However, the circuit through relay F is open because of the open meter contacts 7—8 so that the pilot valve remains open until the meter has completed one revolution, when, contacts 7—8 being again closed, relay F becomes active and cuts off current to the solenoid D of the pilot valve.

Although during this operation contacts 37—38 of relay F are closed, no current flows to the timing device T since the return circuit of the latter is open at the contacts 22—23 of the gate switch H which is still in its upper or sudsing position.

Water may also be admitted to the washer in 30-gallon charges at the end of the automatic rinsing stage by successive momentary manipulations of the "additional water" switch AW, without integrating the amount of additional water. Also, as before, the timer T will not become active with activation of relay F, since its return circuit, in this instance, will be open at the contacts 15—16 of the ratchet relay.

The ratchet relay may be returned to its zero or homing position at any time by closing the reset switch RS, since this operation closes a circuit from L1 to L2 through the reset coil B2 over wires h, i and f. Energizing coil B2 withdraws a spring biased pawl 42 from engagement with the ratchet wheel 43, which immediately coasts to homing position through reaction of spring B3.

The ability to admit any number of individual charges of 30 gallons of water, after the end of the automatic rinsing operation has been indicated by the illumination of the green lamp, is desirable because this hand operation facilitates treatment of the load with sour and blue, since these may be added by means of the supply tank 201 and allowed to remain in the washer as long as may be deemed necessary, after which water may be added for rinsing by manual operation of the "additional water" switch AW.

As many possible embodiments may be made of the above invention without departing from the scope thereof, it is to be understood that all matter herein set forth or shown in the accompanying drawings is to be interpreted as illustrative and not in a limiting sense.

We claim:

1. A flow control system for controlling the liquid supply to a washing machine or the like which comprises a supply conduit, a supply valve in said conduit, a meter for measuring the passage of successive charges of liquid of predetermined amount through said conduit, a source of electric energy, an electric circuit closed by means associated with said meter after the passage of each said predetermined charge of liquid connected between terminals of said source, first and second relays having electrically operated actuating members operatively associated with said meter controlled circuit, a control circuit for said supply valve extending between terminals of said source including electrically operable means for operating said valve, an electrically operable timing device operatively associated with said valve control circuit, means associated with said first relay for alternately causing operation of said valve operating means and said timing device, means associated with said timing device alternatively with said meter circuit closing means controlling operation of said second relay, and means associated with said second relay to control operation of said first relay, whereby liquid is supplied to said machine periodically in successive charges of predetermined amount.

2. An electrical control system for controlling the operation of a liquid supply valve which comprises an electric circuit supplying current to an electrical operating means for said valve, a second electric circuit for supplying current to the actuating members of first and second interrelated relays, a meter for indicating the passage of a charge of liquid of predetermined amount through said valve having means for making and breaking said second circuit with the passage of each charge, a timing device made operable by an operation of said first relay connecting said timing device with said valve operating circuit, control means for said second relay rendered operative by operation of said timing device, control means for said first relay rendered operative by operation of said second relay, and control means for said valve operating means rendered operable by a reverse operation of said first relay, whereby said control system effects control of said supply valve to supply liquid periodically in successive charges of predetermined amount.

3. An automatic electrical control system for controlling the operation of a liquid supply valve to supply liquid periodically in successive charges of predetermined amount, which comprises in an electrical network, operating means for said valve connected in one portion of said network and normally conditioned by initial manual control to open said valve, a meter for indicating the passage of a charge of liquid of predetermined amount through said valve, an electrically operated timing device, a relay operated circuit changer controlled conjointly in another portion of said network by the operation of said meter and a relay switch, and operable to cause said valve operating means to close said valve and simultaneously start operation of said timing device, contact means rendered operative by operation of said timing device to effect operation of said relay switch so as to render said circuit changer inoperative, and thus effecting opening of said valve and terminating the operation of said timing device, and means associated with said meter adapted to energize said other portion of said network after the passage of each charge to effect operation of said circuit changer, and to deenergize said network when said meter is again activated by flow through said valve.

4. An automatic electrical control system for controlling the operation of a liquid supply valve to supply liquid periodically in successive charges of predetermined amount, which comprises in an electrical network, operating means for said valve connected in one portion of said network and normally conditioned by initial manual control to open said valve, a meter for indicating the passage of a charge of liquid of predetermined amount through said valve, an electrically operated timing device, a relay operated circuit changer controlled conjointly in another portion of said network by the operation of said meter and a relay switch, and operable to cause said valve operating means to close said valve and simultaneously start operation of said timing device, contact means rendered operative by operation of said timing device to effect operation of said relay switch so as to render said circuit changer inoperative, and thus effecting opening of said valve and terminating the operation of said timing device, means associated with said meter adapted to energize said other portion of said network after the passage of each charge to effect operation of said circuit changer, and to deenergize said network when said meter is again activated by flow through said valve, mechanism having operating means associated with and operable in response to each closing of the circuit controlling means of said meter to integrate successive charges passing said meter, and means operable in response to a predetermined number of successive operations of the said mechanism to render the automatic control system inoperative.

5. An automatic electrical control system for controlling the operation of a liquid supply valve to supply liquid periodically in successive charges of predetermined amount, which comprises in an electrical network, operating means for said valve connected in one portion of said network and normally conditioned by initial manual control to open said valve, a meter for indicating the passage of a charge of liquid of predetermined amount through said valve, an electrically operated timing device, a relay operated circuit changer controlled conjointly in another portion of said network by the operation of said meter and a relay switch, and operable to cause said valve operating means to close said valve and simultaneously start operation of said timing device, contact means rendered operative by operation of said timing device to effect operation of said relay switch so as to render said circuit changer inoperative, and thus effecting opening of said valve and terminating the operation of said timing device, means associated with said meter adapted to energize said other portion of said network after the passage of each charge to effect operation of said circuit changer, and to deenergize said network when said meter is again activated by flow through said valve, mechanism having operating means associated with and operable in response to each closing of the circuit controlling means of said meter to integrate successive charges passing said meter, means operable in response to a predetermined number of successive operations of the said mechanism to render the automatic control system inoperative, and a switch manually operable momentarily to effect operation of said circuit changer to supply a single charge through said valve after the automatic control system has been rendered inoperative.

HENRY C. A. MEYER.
ARNOLD ERLANGER.